United States Patent
Yui

(10) Patent No.: US 8,510,359 B2
(45) Date of Patent: Aug. 13, 2013

(54) PSEUDO-RANDOM NUMBER GENERATION DEVICE, PSEUDO-RANDOM NUMBER GENERATION PROGRAM, AND MEDIUM CONTAINING PSEUDO-RANDOM NUMBER GENERATION PROGRAM

(76) Inventor: Kiyoto Yui, Tokyo (JP)

( * ) Notice: Subject to any disclaimer, the term of this patent is extended or adjusted under 35 U.S.C. 154(b) by 862 days.

(21) Appl. No.: 12/446,995

(22) PCT Filed: Oct. 31, 2007

(86) PCT No.: PCT/JP2007/071256
§ 371 (c)(1),
(2), (4) Date: Jan. 8, 2010

(87) PCT Pub. No.: WO2008/053936
PCT Pub. Date: May 8, 2008

(65) Prior Publication Data
US 2010/0115231 A1    May 6, 2010

(30) Foreign Application Priority Data
Oct. 31, 2006   (JP) ................................ 2006-297184

(51) Int. Cl.
*G06F 1/02*    (2006.01)

(52) U.S. Cl.
USPC .......................................... 708/250; 708/255

(58) Field of Classification Search
USPC ................... 708/250, 253, 256, 255
See application file for complete search history.

(56) References Cited

U.S. PATENT DOCUMENTS
2007/0266067 A1 * 11/2007 Matsui .......................... 708/250
2008/0199004 A1 * 8/2008 Mantin et al. ................... 380/42

FOREIGN PATENT DOCUMENTS
JP          4-182828        6/1992
JP          2005-149412     6/2005

* cited by examiner

*Primary Examiner* — Chuong D Ngo
(74) *Attorney, Agent, or Firm* — Frommer Lawrence & Haug LLP; William S. Frommer

(57) ABSTRACT

[Problems] To provide a highly efficient pseudo-random number generation device which can be used in a small-scale computer and a mobile terminal.
[Means for Solving Problems] A memory table having n elements is prepared. A unique value is set for each of the n elements. By changing the contents of the respective elements in the memory table so as to change the memory table state. The change is extracted as a random number. Thus, it is possible to obtain a random number table of a cycle of power n at the maximum.

7 Claims, 7 Drawing Sheets

US 8,510,359 B2

PSEUDO-RANDOM NUMBER GENERATION DEVICE, PSEUDO-RANDOM NUMBER GENERATION PROGRAM, AND MEDIUM CONTAINING PSEUDO-RANDOM NUMBER GENERATION PROGRAM

TECHNICAL DOMAIN

This invention relates to a device and program used to generate the pseudo-random numbers, and relates to a recording medium which can be read by the computer containing a program. Especially, it relates to the generation of pseudo-random number used in few of the resources like built-in devices, consumer products, mobile devices, small size information terminals and small size game terminal devices, etc.

BACKGROUND TECHNOLOGY

Usually, it attempts to achieve the random number generation with limited resources. The means to generate the random numbers with one's own device is indicated. (Refer to patent document 1).

Mersenne twister with Mersenne primes is a pseudo-random number generator developed by the Makoto Matsumoto and Takuji Nishimura in 1997 (Thesis was announced on January, 1998). It is proved that the period is $2^{19937}-1$ or 623 words (19937 bits, 2492 bytes), and 623-dimensional equi-distribution property is assured. (Refer to non-patent document 1).

Besides, the introduction page of the ciphering publicly declared by the Ministry of Foreign Affairs is available. It plainly introduces the finite random number code and the infinite random number code. Here, it is described that the infinite random number code cannot be logically deciphered. (Refer to non-patent document 2).

The research is continued because the good quality random numbers for ciphering are necessary. However, demand is high for the logically complex random number generator with a fast speed, long cycle and which works on comparatively small machine. Mersenne Twister is strong from cycle point view. However, it has some weak points like it is not suitable for ciphering since the value prior to the constant random number sequence becomes predictable if constant random number sequence is output and so the demand for the new pseudo-random number generation device is high.

Patent Document 1: Japanese published unexamined application H10-247140

Non-Patent Document 1: M. Matsumoto and T. Nishimura, "MersenneTwister: A 623-dimensionally equidistributed uniform pseudorandom number generator", ACM Trans. on Modeling And Computer Simulation Vol. 8, N0.1, January pp. 3-30 (1998) http://www.math.sci.hiroshima-u.ac.jp/~m-mat/MT/mt.html Non-patent document 2: Ministry of Foreign Affairs Secretariat telecommunication section, Part-time lecturer, Sadao Okumura [Diplomacy and ciphering] http://www.mof-a.go.jp/mofaj/annai/shocho/e_seifu/toukou2004.html

DISCLOSURE OF THE INVENTION

PROBLEMS TO BE SOLVED BY THE INVENTION

Figure 1:
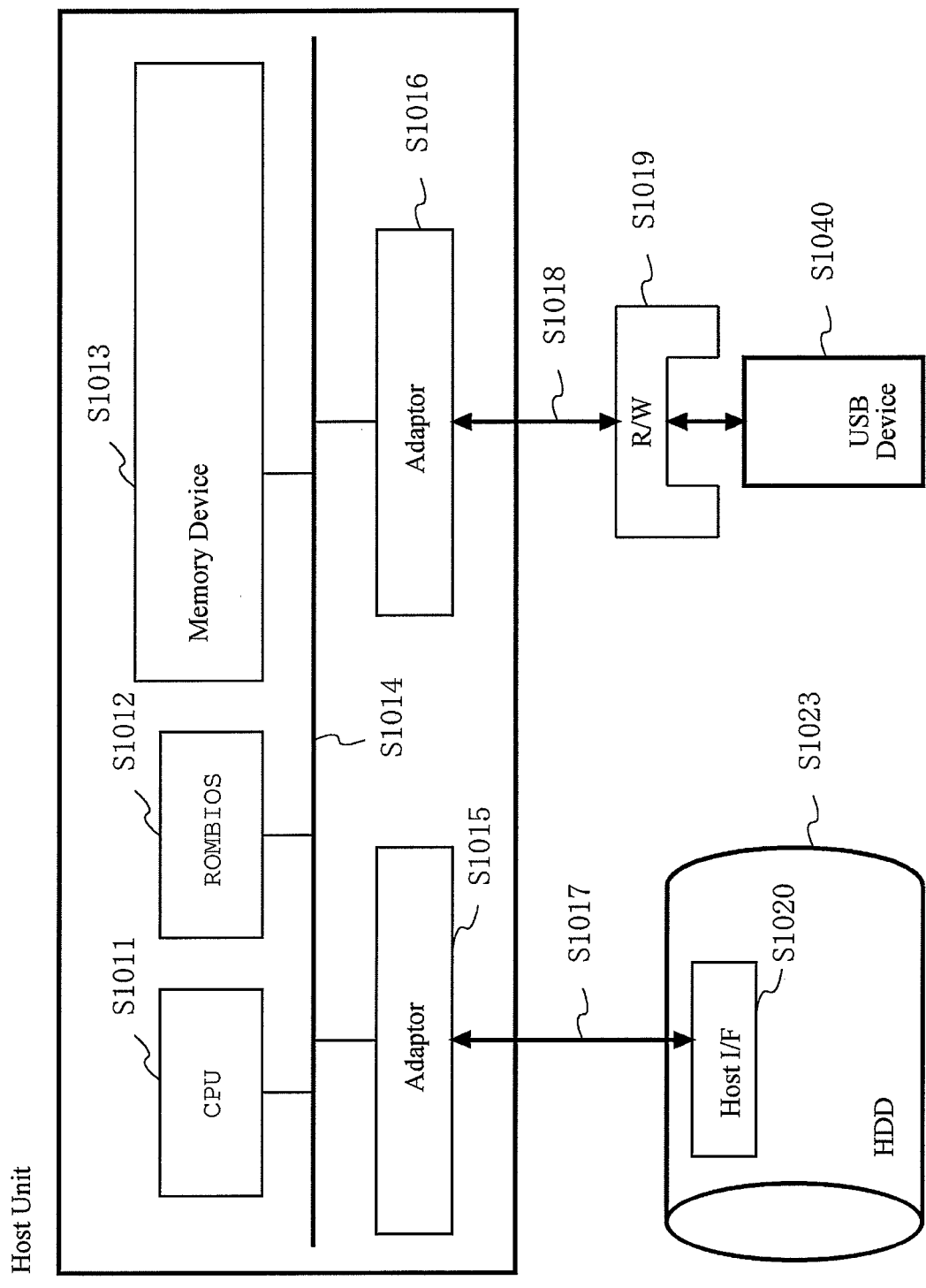
FIG. 1 Block diagram indicating the device that is the host.

As mentioned above, finite random numbers and infinite random numbers exist in data encryption. Finite random numbers is a method used for encryption where the same random number table is repeated. It is efficient and at the same time, once the random number table is deciphered, it can be easily deciphered later.

On the other hand, infinite random numbers is a method where the random number table used once is not used a second time. Infinite random number is a code where the same random number is not used twice, and it has been proven by the information theory that only by using once, it cannot be completely deciphered.

For encryption of strong infinite random numbers in electronic calculators and small size PDA (Personal Digital Assistant), it is necessary to generate long-period pseudo-random numbers at high speed. This invention efficiently generates long-period pseudo-random numbers to provide for electronic calculators, small terminals, and electronic equipments.

MEANS FOR RESOLVING THE PROBLEMS

This invention provides for instance, a ring buffer-shaped Memory Table A with n elements, resembling a dice with n pieces. A different value is stored in the n elements one by one.

2 arbitrary elements are selected from this Memory Table A and replaced with each other. The contents of Memory Table A are shuffled by repeating this process, and a random number sequence of n can be generated by retrieving the value of the n elements as random numbers.

Random number sequence obtained by this process, in other words, the state of the Memory Table obtains a combination of the factorial of n. When n is assumed to be 256, theoretically, the following combination can be obtained.

The factorial of 256 is approximate to the product of 8.57 and the 506th power of 10

Thus, it is understood that when Memory Table A is used, the theoretical maximum combination value (number of combinations) can be increased by increasing the number of elements.

When Memory Table A is assumed to be random number sequence; this combination value is the theoretical maximum cycle. When the conversion of the 2 elements of Memory Table A is done uniformly in the best way possible, the cycle of the random number sequence reaches the theoretical maximum value. When this change is not uniform, this reflects in the shape of the cycle of the random numbers and the cycle becomes small. In other words, the quality of the random number sequence deteriorates.

An example of a desirable change can be understood by conversely enumerating a bad change example. A bad conversion example can be considered as the one where the arbitrary elements of Memory Table A are changed with the element prior to n. For instance, in a ring buffer having n elements, since the element prior to n is cyclically the element itself, eventually, the table does not change. Although this example indicates an extremely bad case, similar to this case, a bad change is the one where there is no change as a whole by only replacing 2 specific elements with each other.

To ensure that such a thing does not occur, it is necessary to find a way to always make changes evenly within the table such that the physical relationship (position) of the 2 elements to be changed does not result in the repetition of the same thing.

Here, focusing on prime numbers, the special value that cannot be further divided, the prime number value of only a single element in Memory Table A should be changed with the previous element.

If this is repeated for each element, a desirable shuffle can be executed by replacing all the elements. Now here, assume the number of elements of Memory Table A to be n. Consider the change of the contents of the elements of this Memory Table A by prime number p.

For the Memory Table A that composes the ring buffer, exchange the contents of the elements prior to p element, for the elements indicated at present. When the exchange ends, the ring buffer is rotated by 1 element and is shifted by 1. When this process is executed repeatedly, all the contents of Memory Buffer A loop back and a cycle is calculated.

The prime number is a figure whose greatest common divisor is the number itself. Thus, since greatest common divisor of a prime number is the number itself, the cycle is said to be the common multiplier of the number of elements n of the Memory Buffer A and prime number p.

In other words, $$Cycle = n \times p$$

It can be considered as equivalent or approximately equal to this mathematical expression. In addition, when the prime number is incremented as p1, p2 ... pn−1 (n is a positive integer), and when p1, p2 ... pn−1 is used sequentially while changing each of the elements of Memory Table A, $$Cycle = n \times p1 \times p2 \times \ldots \times pn-1 \text{ (}n\text{ is a positive integer)}$$

It can be considered as equivalent or approximately equal to this mathematical expression. Thus, this invention is characterized by the shuffling of Memory Table A by changing the elements for Memory Table A that is for instance a ring buffer, using a prime number.

Random numbers can be obtained by retrieving the elements or all the content of Memory Table A at an arbitrary timing.

That is, this invention provides a Memory Device for the information and the Memory Table A that has n elements (n is a natural number) stored in this memory device. Moreover, it provides the Random Number Value Output Means whereby the value stored in the arbitrary elements of this Memory Table A is retrieved, and the concerned value is output as a random number value. In addition, it also provides Table Changing Means for the permutation of the elements in Memory Table A.

You can install Memory Table B with m elements (m is a natural number) in the memory device. In this case, the Table Changing Means can permute the elements in Memory Table A as per the numerical value of the elements of this Memory Table B. You can have arbitrary prime numbers as the value of the elements of Memory Table B.

As for the Table Changing Means, the elements of Memory Table A are sequentially selected one by one, and the contents of the elements prior to p element (p is a natural number) are replaced with respect to the currently selected elements. In this case, the value of the elements of Memory Table B is acquired sequentially as the numerical value p.

Or, in the Table Changing Means, the elements of Memory Table A are sequentially selected one by one, and the value of the elements selected at present can be changed as per the numerical value of the element prior to p element (p is a natural number) with respect to the currently selected elements. In this case, the value of the elements of Memory Table B is acquired sequentially as the numerical value p.

Moreover, the index memory N to indicate the arbitrary elements of Memory Table A can be provided in the memory device. In this case, the Table Changing Means changes the contents with respect to the elements of Memory Table A that indicate the value of this index memory N.

Moreover, after the Table Changing Means changes the content of Memory Table A by index memory N, only the value of arbitrary constant K can be added to the value of index memory N. As a result of the said addition, when the value of index memory N indicates a point after the end (terminal) of Memory Table A, the value of index memory N is changed to the starting value of Memory Table A.

Moreover, the index memory M to indicate the arbitrary elements of Memory Table B can be provided in the memory device. In this case, the Table Changing Means retrieves the elements of Memory Table B that indicate the value of this index memory M and performs the operation of Memory Table A as value p.

After the Table Changing Means acquires the value p from Memory Table B depending on index memory M, only the value of arbitrary constant K can be added to the value of index memory M. As a result of the said addition, when the value of index memory M indicates a point after the end (terminal) of Memory Table B, the value of index memory M is changed to the starting value of Memory Table B.

Moreover, this invention also provides the means to accept the value of index memory N from outside this device and the means to set the said accepted value in index memory N.

Similarly, this invention also provides the means to accept the value of index memory M from outside this device and the means to set the said accepted value n index memory M.

Each of the above-mentioned means is actually achieved by the processing device by executing a fixed program. Moreover, the Memory Device is an inclusive concept that includes temporary storage, mass storage and removable medium.

Best Format to Execute the Invention:

The Embodiments of this invention are explained using drawings.

Embodiment 1

This Embodiment 1 discloses a program and a device that generates the pseudo-random number. FIG. 1 is the complete block diagram of the computer system or electronic equipment used in Embodiment 1 and the Embodiments described hereafter.

Computer system of FIG. 1 is installed with an information processor S1011. This Information Processor S1011 is the central processing unit (henceforth, referred to as CPU) that executes the entire control and various programs of the computer. Moreover, the computer system of FIG. 1 is provided with a Memory Device S1013 where S1012 of ROMBIOS, adaptor S1015, S1016, various programs, and data are loaded, and they are connected with the System Bus S1014. Moreover, the computer system of FIG. 1 is provided with an Input Device for the user to input data and a Display Device to display information to the user (Abbreviation shown in the Figure).

Adaptor S1015 is connected with Host Interface S1020 of HDD-S1030. Moreover, Reader Writer S1019 is connected with Adaptor S1016. A detachable storage device is connected to this reader writer S1019.

USB Device S1040 is used as a storage device in the present application. USB Device S1040 has the function of a storage device. Hereafter, in the present application, although the USB Device S1040 is explained as a Memory Disk Device, USB Device S1040 can be any arbitrary device if it can accomplish the effect of this invention.

ROMBIOS-S1012 is provided with a) Steps to select one device from the devices that can boot the system of HDD-S1030 or USB Device S1040, which is a storage device, b) Steps to read the system boot loader from the said device in the Memory Device S1013, and c) Steps to branch out to the said read system boot loader (so-called System Boot Function).

The OS program read from HDD-S1030 or the arbitrary storage device is stored in Memory Device S1013, and executed by CPU-S1011.

Moreover, CPU-S1011 achieves the operation of each Embodiment described hereafter by executing various programs. The operation of each Embodiment is explained with a flowchart.

In this application, the special symbols and various notations of the flowchart of the process executed by CPU-S1011 are as per the C language, which is the computer language. In the statements, among the variables that are not specifically declared, the type of the variables that refer to the memory address is the pointer type and the type of other variables is the int type.

% . . . Symbol indicating remainder calculation

^ . . . Symbol indicating exclusive OR

++ . . . Symbol indicating increment, meaning increasing the value by 1

[n] . . . Symbol indicating an array. n is the index of the array.

Figure 2:
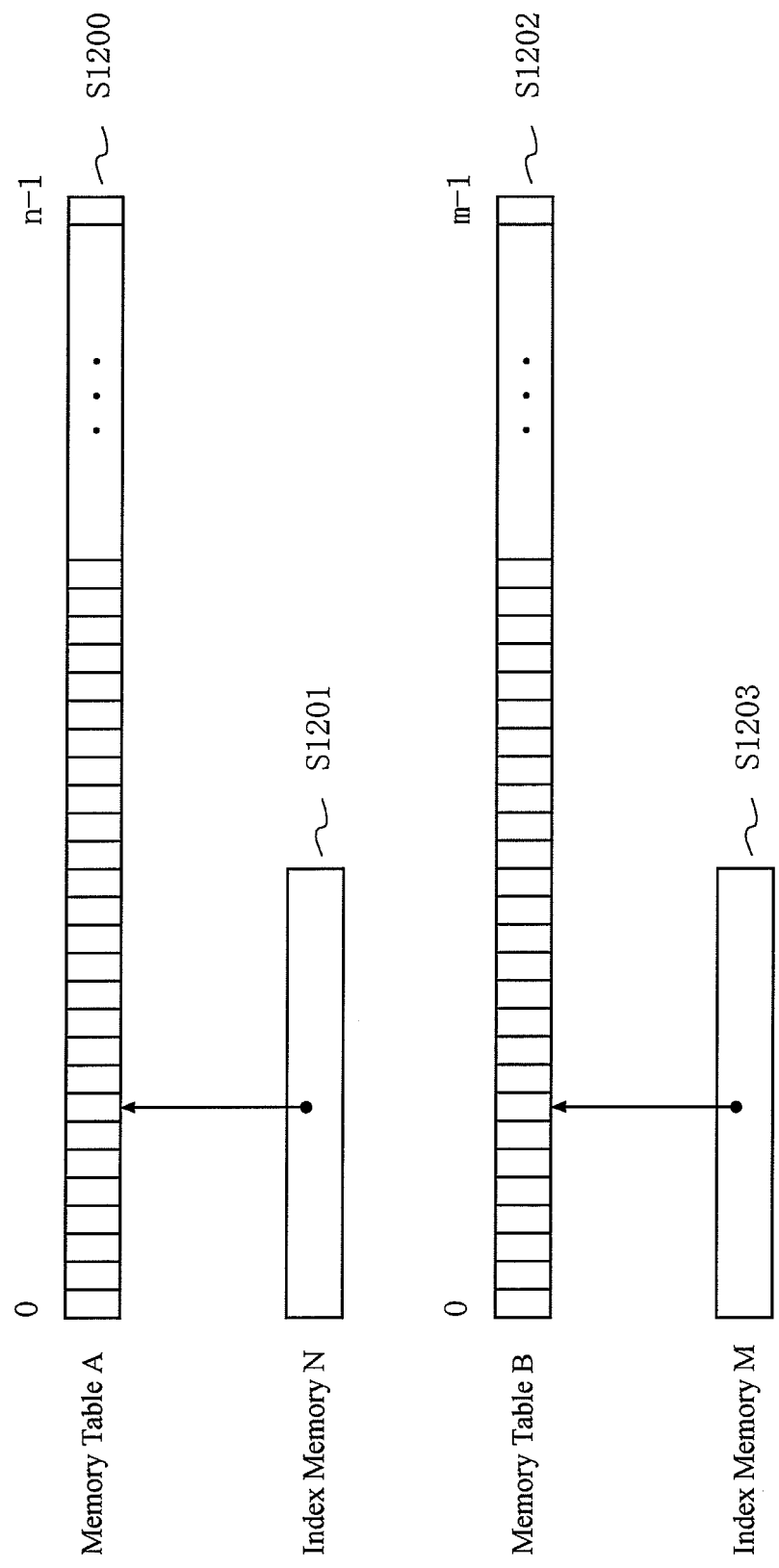
FIG. 2 Explanatory drawing indicating the input output in Embodiment 1.

* . . . When written before the address type variable, it indicates the value in the address indicated by the variable 0x . . . Indicates the numerical value of hexadecimal notation FIG. 2 shows the composition of the memory area used by the initialization program inz( ) in the 1st Embodiment of this invention. When initialization program inz( ) is executed, CPU-S1011 secures the memory area shown in FIG. 2 in Memory Device S1013.

In FIG. 2, S1200 is Memory Table A. Memory Table A has n (n=1, 2, 3 . . . ) elements.

If constant n is within the range of the power of expression permitted by the following Memory Variable S1201, a value permitted by the memory of the computer system can be set.

In this Embodiment, since a hexadecimal random number value is to be generated, the entire unit is designed such that n is a value that is the multiple of 256. In this Embodiment, n is assumed to be 256.

Moreover, the size of each element is essentially arbitrary. The size can be increased depending on the size of the random numbers to be obtained. The size of each element in Embodiment 1 is 1 byte.

S1201 is a Memory Variable. It stores the position information of the elements of S1200. The size of this memory variable is arbitrary if the size is sufficient to express all the elements of S1200.

Here, it is assumed to be a 2 byte type with the power of expression of Zero ~65535.

S1202 is Memory Table B. Memory Table B has m elements. Constant m is any arbitrary value. The value permitted by the memory of the computer system can be set. In this Embodiment, m is set as 7 in order to make the operation easy to understand.

Moreover, although the size of each element of Memory Table B is also arbitrary, in this Embodiment it is assumed to be 2 bytes.

S1203 is a Memory Variable. It stores the position information of the elements of S1202. The size of this memory variable is 2 bytes in this Embodiment.

Figure 3:
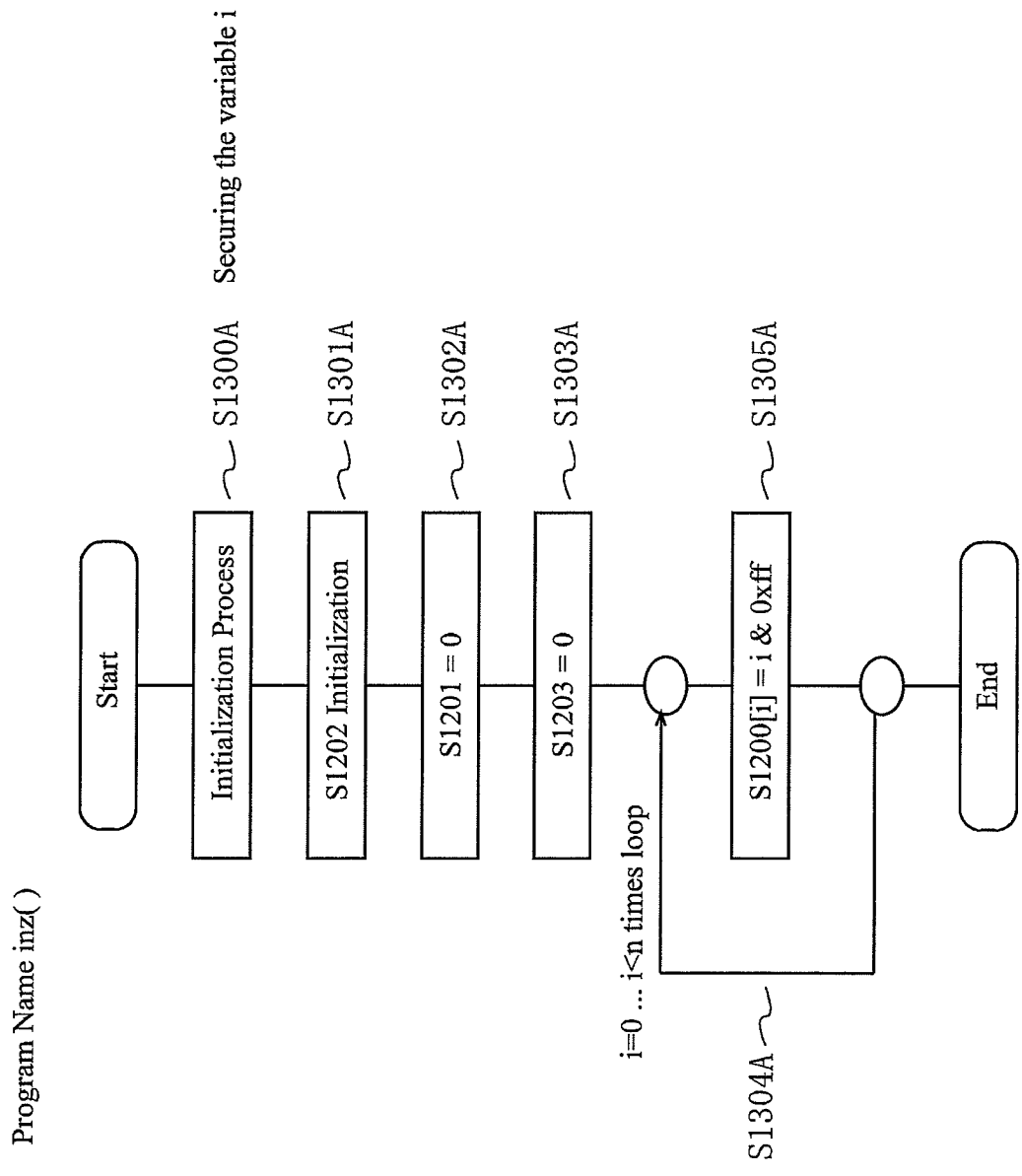
FIG. 3 Flowchart indicating the flow of initialization in Embodiment 1.

FIG. 3 shows the processing flow of initialization program inz( ) in Embodiment 1.

This process is initialized with S1300A. Memory variable i of the 2-byte type is secured. The size of variable i can be different if it can express the elements of Memory Table A-S1200 of FIG. 2.

Memory Table B-S1202 with m elements shown in FIG. 2 is initialized in S1301A. To be more precise, m prime numbers such as 2, 3, 5, 7 . . . are registered in each element. In this Embodiment, since m is 7, the values 2, 3, 5, 7, 11, 13, and 17 are stored in each of the 7 elements of S1202.

In S1302A, zero is set in S1201 of FIG. 2.

In S1303A, zero is set in S1203 of FIG. 2.

S1304A is a loop process. Variable i is initialized to zero, the value of i is incremented by 1 for each loop and the loop is executed n times. The process ends after looping n times.

In S1305A, the value is stored in S1200. It stores the value where AND is applied with the hexadecimal number ff in the value of i for the ith element from the starting of S1200.

This AND process is a mechanism of storing only the numerical value of hexadecimal zero ~ff in each element of S1200.

Figure 4:
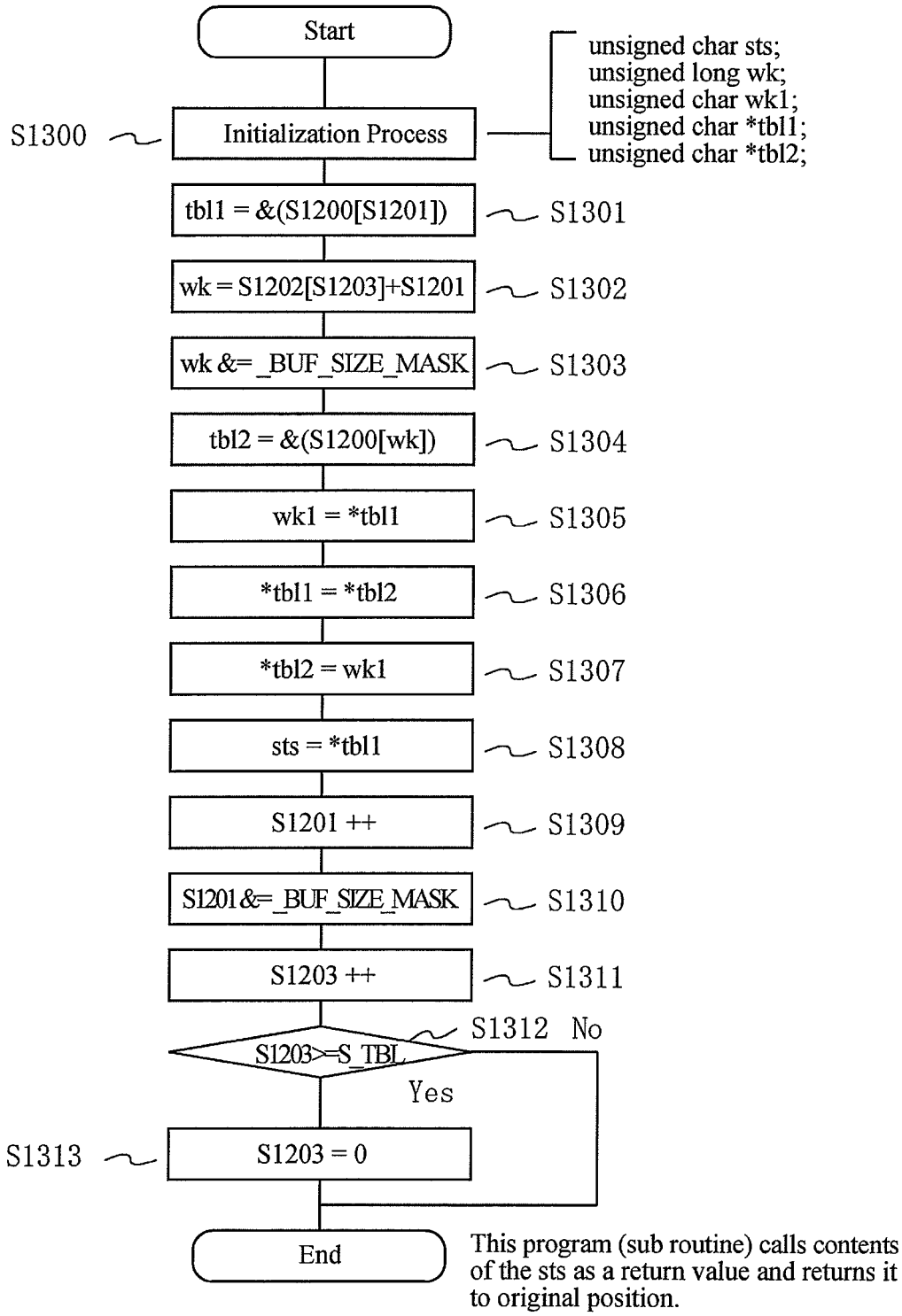
FIG. 4 Flowchart indicating the flow of the random number generation in Embodiment 1.

FIG. 4 shows the processing flow of the random number generation program rnd( ) in Embodiment 1. rnd( ) generates random numbers and the return value is a 1-byte random number. It is the main process of this Embodiment.

S1300 executes the initialization process. Variable sts, wk, wk1, tbl1, and tbl2 are secured here.

S1301 stores the value from Memory Table A-S1200 indicated by S1201 in variable tbl1, such that the element number is the start address of the element. For the time being, in case S1201 is assumed to be zero, it stores the starting address of the $0^{th}$ element i.e. the first element of S1200.

In variable wk, S1302 stores the value from Memory Table B-S1202 where value of S1201 is added to the value of the element at the location equal to the value indicated by S1203.

In S1303, there is a limitation that the value of wk cannot indicate a value higher than the number of elements of S1200. Constant_BUF_SIZE_MASK has the value equal to n−1 where n is the number of elements of S1200.

In this Embodiment, this program is executed normally when the number of elements n is an integral multiple of 256 (hexadecimal number 100).

In this Embodiment, since n is assumed to be 256, the value of constant_BUF_SIZE_MASK is 255 (hexadecimal number ff). Moreover, AND is performed between the value of wk and constant_BUF_SIZE_MASK, and the resultant value is stored in wk.

In other words, wk always indicates an element between the $0^{th}$ element to the last element of S1200.

In S1304, variable tbl2 stores the start address of the element from Memory Tables A-S1200, whose element number is the value indicated by wk. For the time being, if wk is assumed to be zero, it stores the start address of the $0^{th}$ element i.e. the first element of S1200.

In S1305, the value of the address indicated by variable tbl1 is read, and stored in variable wk1. Since variable tbl1 indicates the address of any of the elements of S1200, the start address of one of the elements from the resulting S1200 is stored in wk1.

In S1306, the value of the address indicated by variable tbl2 is read, and stored in the address indicated by variable tbl1. Since variable tbl1, tbl2 respectively indicate the address of any of the elements of S1200, the value of one of the elements of the resulting S1200 is stored in the other element.

In S1307, the value of wk1 is stored in the address indicated by variable tbl2. Since variable tbl2 indicates the address of any of the elements of S1200, the value of wk1 is stored in one of the elements of the resulting S1200.

In S1308, the contents of the address indicated by variable tbl1 are stored in variable sts.

Since variable tbl1 indicates the address of any of the elements of S1200, the value of one of the elements of the resulting S1200 is stored in sts.

In S1309, the value stored in S1201 is incremented by 1.

In S1310, AND is performed on the value of S1201 by constant_BUF_SIZE_MASK and that result is stored in S1201. With this, the value indicated by S1201 always points at the element of S1200.

S1201 sequentially refers to the $0^{th}$ element $\sim(n-1)^{th}$ element of S1200. That is, S1201 is a pointer to use S1200 as a ring buffer.

S1311 increments the value stored in S1203 by 1.

In S1312, the value of S1203 is compared to determine whether it is more than the value of constant S_TBL. The value of S_TBL is equal to the number of elements m of Memory Table S1202. This process determines whether the value of S1203 indicates the element of Memory Table S1202.

If No, nothing is done if it indicates an arbitrary element of S1202.

If Yes, the S1313 process is executed. In S1313, zero is stored in the value of S1203.

S1203 sequentially refers to the $0^{th}$ element $\sim(n-1)^{th}$ element of S1202. That is, S1203 is a pointer to use S1202 as a ring buffer.

When this program ends, the contents of sts are returned to the calling side as a return value of the sub routine. The content of sts is a random number value.

As explained above, random number generation device is achieved when the CPU executes program inz( ) and rnd( ). The combination of these 2 programs or devices is the invention of this Embodiment. This Embodiment achieves this applied invention as a sub routine group called the software library.

This invention has achieved random numbers generated so far by complex calculations with high load on the CPU, by this simple technique. The problems in the conventional methods were that in the most common Combined Square Method of generating random numbers, the square of the numerical value of 32 bits is calculated and random number are obtained by taking the remainder in a specific constant. In this case, multiplication, which is the CPU process with the slowest speed, is performed. In addition, in case of a CPU of less than 32 bits (4 bytes), since this 32-bit numerical value is directly executed, the processing becomes dramatically slow. Moreover, the Combined Square Method generates random numbers by squaring the numerical value. The number of digits must be increased to generate long-period random numbers. However, the processing of CPU increases at an exponential rate as the number of digits increases and the processing slows down.

In this way, as compared to the conventional methods, this invention achieves its objective only by the basic function of the CPU known as Memory Change. In addition, it displays the character whereby if the internal table is increased to lengthen the cycle of random numbers, it increases linearly. Thus, it succeeds in the efficient generation of long-period random numbers in the computer.

Embodiment 2

Embodiment 2 is also a program and a device that generates pseudo-random numbers.

This Embodiment provides a more comprehensive conclusion as a pseudo-random number generation program using Embodiment 1.

Figure 5:
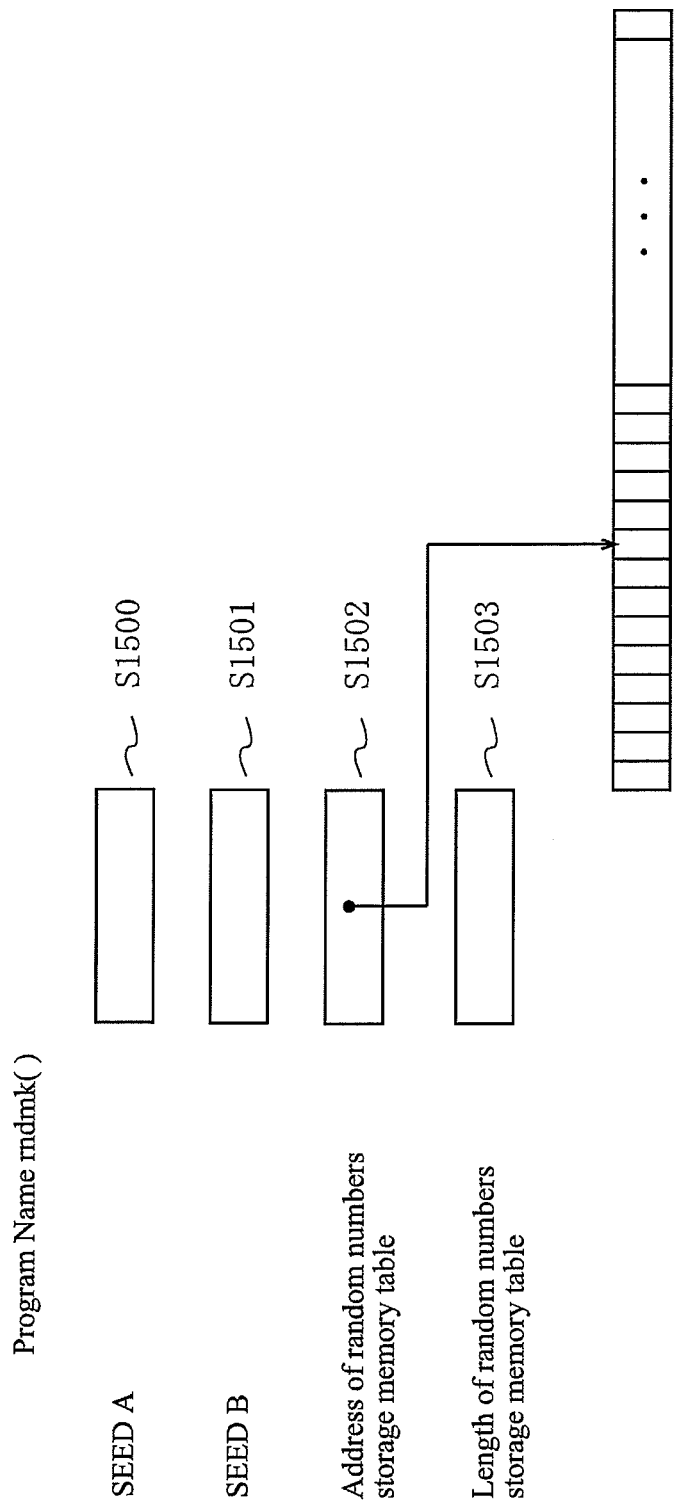
FIG. 5 Explanatory drawing indicating the input output in Embodiment 2.

FIG. 5 shows the composition of the memory area used by the random number generation programs rndmk( ) in Embodiment 2. When random number generation program rndmk( ) is executed, CPU-S1011 secures the memory area shown in FIG. 5 in Memory Device S1013.

S1500 is a Memory Variable that specifies the seed of the random number sequence. The numerical value from zero to n−1 of n elements of S1200 is specified in this Memory Variable. S1500 is a memory of 4 bytes.

S1501 specifies the seed of the random number sequence. The numerical value from zero to m−1 of m elements of S1202 is specified here. S1501 is a memory of 4 bytes.

S1502 is a pointer-type memory variable that stores the address of the generated random numbers in the memory.

S1503 has the value of the length of the memory that secures the value of S1502 as a start address.

This Embodiment secures the Memory Table that stores the random numbers, and if it is executed by setting a fixed value in S1500, S1501, S1502, and S1503, random numbers are automatically generated. Random numbers are generated in the Memory Table.

Figure 6:
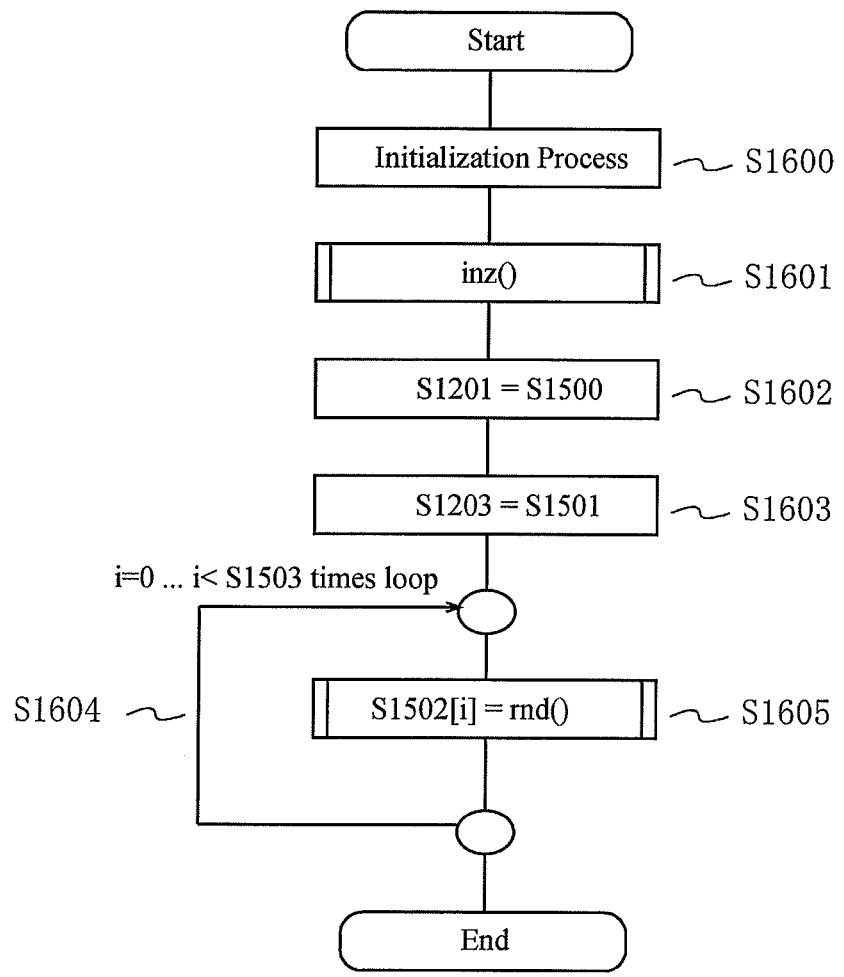
FIG. 6 Flowchart indicating the flow of the random number generation process in Embodiment 2.

FIG. 6 shows the processing flow of random number generation.

S1600 is the initialization process. 4-byte type variable i is secured. The size is 4 bytes.

S1601 executes program inz( ) of Embodiment 1 as a sub-routine.

S1602 sets the contents of S1500 in S1201. When the memory size of S1201 is small, discard the higher-order bit of S1500 and set only the lower-order bit.

S1603 sets the contents of S1501 in S1203. When the memory size of S1203 is small, discard the higher-order bit of S1501 and set only the lower-order bit.

S1604 is a loop process. First, i is initialized in 0, and the value of i is incremented by 1 for each loop and the loop is executed n times. The process ends after looping n times.

S1605 makes a sub-routine call to the random number generation program rnd( ) of Embodiment 1. The random number value is obtained as a return value. This random number value is stored in the element whose location is calculated with the address indicated by S1502 at the start and the variable i as index. In other words, the said random number value is stored at the $i^{th}$ memory are from the address indicated by S1502.

According to the Embodiment explained above, arbitrary random numbers can be generated only by calling the process of FIG. 6 from other programs as a sub-routine. This Embodiment achieves this invention as the concluding sub-routine.

Embodiment 3

Embodiment 3 is also a program and a device that generates pseudo-random numbers.

Usually, pseudo-random number generation programs are generally provided as indicated in Embodiment 1. This is from the viewpoint of providing small unit parts for increasing the all-purpose characteristic.

This Embodiment is in the form of an application program that stores the random number sequence as a file on the OS using Embodiment 1.

Figure 7:
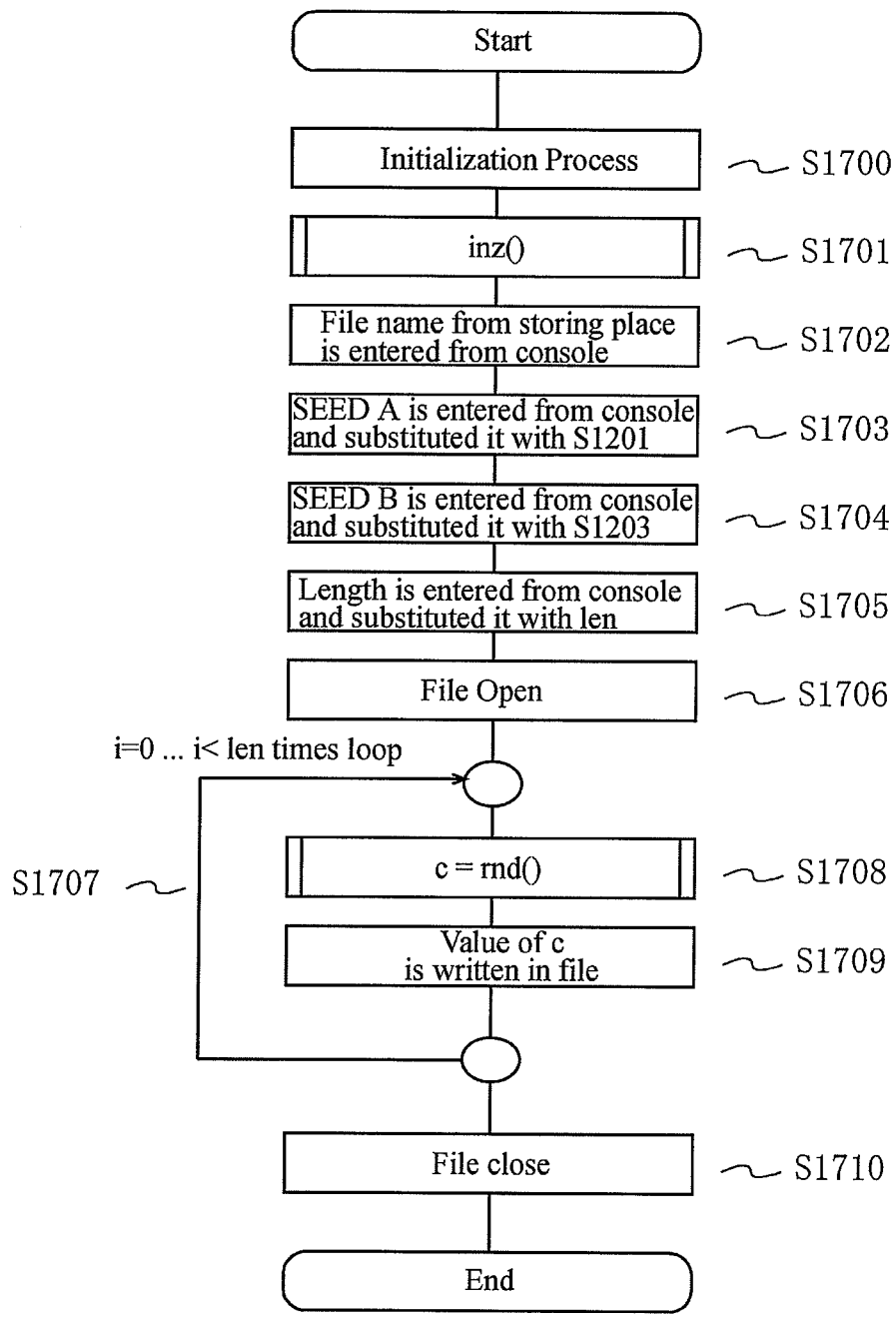
FIG. 7 Flowchart indicating the flow of the random number generation process in Embodiment 3.

FIG. 7 shows the processing flow of this Embodiment. CPU-S1011 executes the process shown in FIG. 7, and functions as a random number generation program.

S1700 is an initialization program. 4-byte type variable len and 1-byte type variable c is secured.

S1701 executes program inz( ) of Embodiment 1 as a sub-routine.

S1702 specifies the file name that stores the random number table from the console.

S1703 inputs the figure that is the seed, from the console and stores it in S1201.

The numerical value that can be entered is from zero to n−1 of the n elements of S1200.

S1704 inputs the figure that is the seed, from the console and stores it in S1203. The numerical value that can be input is from zero to m−1 of the m elements of S1202.

S1705 inputs the size of the random number table, i.e., the length of random numbers, from the console and stores it in variable len.

S1706 creates a file as per the file name entered in S1702 and opens it.

S1707 is a loop process. First, i is initialized in 0, and the value of i is incremented by 1 for each loop and the number of times the loop is executed is equal to the value of variable len. The process ends after the number of times the loop is executed is equal to the value of variable len.

S1708 makes a sub-routine call to the random number generation program rnd( ) of Embodiment 1. The random number value is obtained as a return value. This random number value is stored in variable c.

S1709 writes the value of variable c in the file opened in S1706. The file is maintained in the storage means such as HDD-S1030 or USB Device S1040. The position of writing to the file shifts behind by one byte from the beginning with each loop.

S1710 closes the file opened in S1706.

Therefore, this Embodiment is executed as an application and the random number table is stored on the disk as a file.

Embodiment 4

Embodiment 4 is also a program and a device that generates pseudo-random numbers. Only a part of Embodiment 1 is changed, and instead of changing (replacing) each element of S1200, random numbers are generated by the computation of each element.

The composition is mostly same as Embodiment 1. Here, only the changed part is described.

When function rnd( ) of FIG. 4 is composed, the processing of S1306 is changed. In this Embodiment, exclusive-OR of the value of the address indicated by variable tbl1 and the value of the address indicated by variable tbl2 is performed, and is stored as the value of the memory of the address indicated by variable tbl1 in S1306.

S1307 is deleted.

Therefore, it operates as a pseudo-random number generation program and device.

Embodiment 5

Embodiment 5 is also a pseudo-random number generation program and device. This Embodiment is similar to Embodiment 2 but has some changes. In Embodiment 2, function rnd( ) of Embodiment 1 is executed in S1605 of FIG. 6. In this Embodiment, the changed rnd( ) disclosed in Embodiment 4 is executed as function rnd( ) here.

Embodiment 6

Embodiment 6 is also a pseudo-random number generation program and device. Embodiment 6 is a changed example of Embodiment 3. In Embodiment 3, function rnd( ) of Embodiment 1 is executed in S1708 of FIG. 7. In this Embodiment, the changed rnd( ) disclosed in Embodiment 4 is executed as the rnd( ) executed in S1708.

Finally, the process as per the program of each Embodiment explained above, can also be achieved by firmware and hardware logic.

EXPLANATION OF SYMBOLS

S1011 Central Processing Unit (CPU and processing means)
S1012 ROMBIOS (Storage means)
S1013 Memory Device (Storage means)
S1014, S10017, S10018 System Bus
S1015, S10016 Adapter
S1020 Host I/F
S1030 HDD (Storage means)
S1019 Reader Writer
S1040 USB Device (Storage means)

What is claimed is:

1. A pseudo-random number generation device comprising:
    an information storage device;
    a memory table A stored in the information storage device and having a plurality of elements;
    a random number value output module configured to retrieve a value stored in at least one of the elements of the memory table A and output the retrieved value as a random number value;
    a table changing module configured to permutate elements in the memory table A; and
    a memory table B having a plurality of elements in the information storage device, wherein the table changing module is configured to permutate elements in the memory table A according to a numerical value held by at least one of the elements of the memory table B;
    wherein each of the elements of the memory table B is arranged to have at least one prime number; and
    wherein the table changing module is configured to select the element of the memory table A one by one sequentially, and to swap a content of the currently selected element with a content of the element that is an element prior to the currently selected element by p, and wherein the table changing module is further configured to acquire a value of the prime number of the memory table B one by one as the numerical value p therefor.

2. The pseudo-random number generation device of claim 1, including an index memory to indicate the arbitrary element of said memory table A, and wherein said table changing module changes the value of the element of said memory table A indicated by said index memory.

3. The pseudo-random number generation device of claim 2, wherein said index memory exhibits a value; and wherein said table changing module adds the value of said index memory to an arbitrary constant K after changing the values in said memory table A, and as a result of said addition, when the value of said index memory indicates a point beyond the end element of said memory table A, the value of said index memory is changed to the value of a starting element of said memory table A.

4. The pseudo-random number generation device of claim 2, including means to receive a value for said index memory from an external source, and means to set the received value in said index memory.

5. The pseudo-random number generation device of claim 1 including an index memory having values to indicate arbitrary elements of said memory table B, and said table changing module permutates said values stored in said memory table A in accordance with said value p by retrieving the elements of said memory table B indicated by the value of said index memory.

6. The pseudo-random number generation device of claim 5 wherein said table changing module adds the value of said index memory to an arbitrary constant K after obtaining value p from the element of said memory table B indicated by said index memory, and as a result of the said addition, when the value of said index memory indicates a point beyond the end element of said table A, the value of said index memory is changed to the value of a starting element of said memory table B.

7. The pseudo-random number generation device of claim 5, including means to receive a value for said index memory from an external source and means to set the received value in said index memory.

* * * * *